United States Patent Office 3,265,908
Patented August 9, 1966

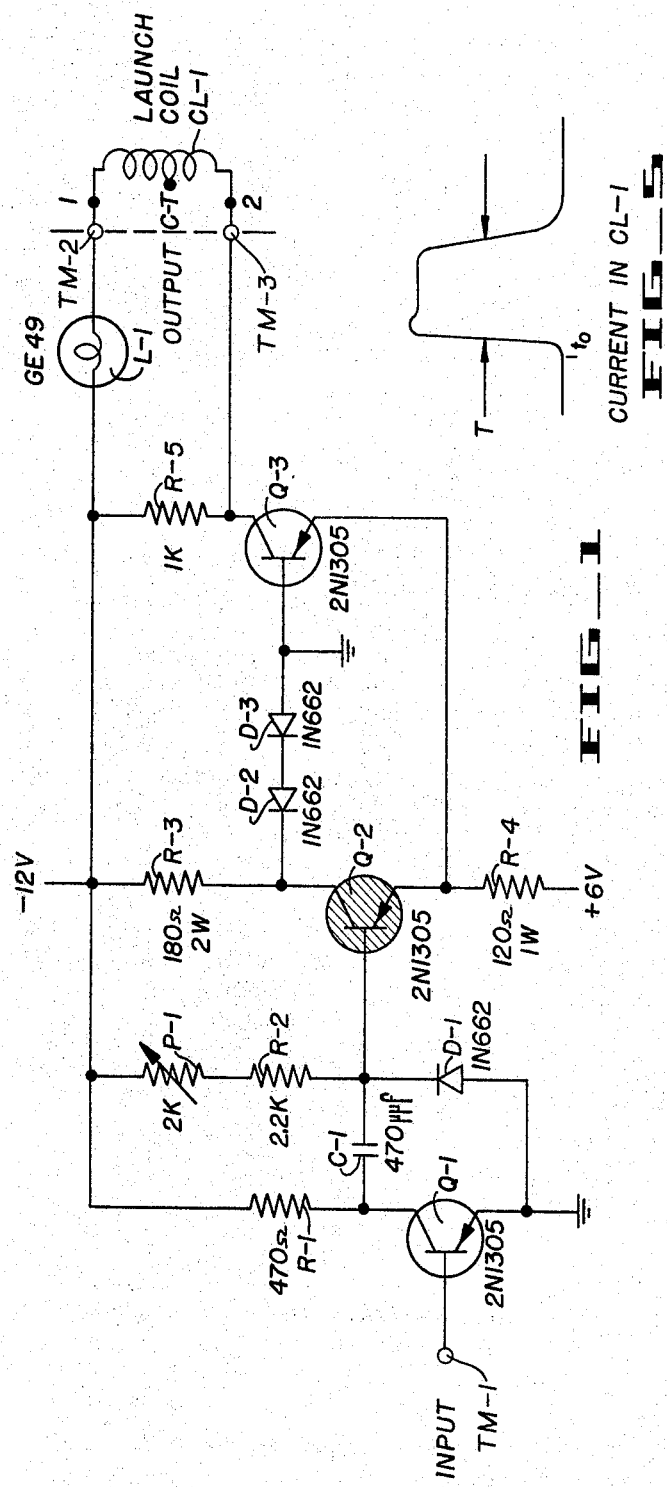

3,265,908
CURRENT PULSE GENERATOR
Robert A. Ragen, Hayward, Calif., assignor, by mesne assignments, to Friden, Inc., San Leandro, Calif., a corporation of Delaware
Filed May 3, 1963, Ser. No. 277,867
5 Claims. (Cl. 307—88.5)

This invention relates to improvements in current pulse generators, and more particularly to improved means for supplying acoustic impulse initiating current pulses to the launch coils of acoustic delay lines.

In the electronic instrumentation and computation arts, electro-acoustic delay lines are employed to provide predetermined time delays between input and output pulses of electric energy. One type of electro-acoustic delay line which may be so employed is described in U.S. Patent No. 3,011,136 of Gordon George Scarrott. In digital computation devices, electro-acoustic delay lines may be used as storage means. That is, a chain of pulses carrying computational information (e.g., numerical values, or coded "instructions") and being interspaced by an amount considerably less than the overall delay time of the delay line are fed to the input transducer of the delay line, sometimes called the "launch coil," and are derived from the output transducer of the delay line having the same time interspacing, and, thus, carrying the same information, but having been respectively delayed in their reappearance at the output transducer by the total delay time of the delay line. Thus, as well-known in the digital computation arts, the information carried by such chains of pulses may be considered to have been "stored" for the delay time of the delay line. It will be apparent, however, that the amount of information which can be "stored" in such a delay line, i.e., the number of pulses which may occupy such a line at a given time, depends upon the "fidelity," or freedom from distortion, of the delay line, and of the driving pulses applied to it. That is, the number of pulses, or amount of information, which can be "stored" in such a delay line, is a function of the "fidelity" of the delay line, in the sense that, in a "high fidelity," or low distortion, delay line, closely time-spaced pulses impressed thereupon by the input transducer will remain "sharp" and distinct while traveling along the line, the disturbance corresponding to each pulse being conveyed along the wire of the line without substantial dispersion, which would cause closely "packed," i.e., closely time-adjacent, pulses to overlap when produced as a voltage wave form at the output transducer.

As noted above, however, the ability of such an electro-acoustic delay line to accurately propagate and provide at its output a high "density" of closely adjacent pulses is also dependent upon the "fidelity" of the current pulses provided to the launch coil for initiating the disturbances, or stress waves, which carry the input pulse information along the wire of the delay line to the output transducer. That is, the driving current pulses supplied to the launch coil of an electro-acoustic delay line of the type used in digital computation and data processing must be as rectangular in character as possible, being characterized by approximately linear leading and trailing edges, minimum rise and fall times, and an accurately flat top, to the degree possible of economically practical accomplishment.

The generation of such driving current pulses having the necessary degree of accuracy as to form has hitherto been carried out by devices which were both expensive and complex, being characterized by the use of a considerable number of circuit elements, and by the use of one, or more, electron devices, e.g., transistors, having especially critical, and, therefore, expensive to obtain, electrical characteristics. The necessity for the employment of such expensive and complex input driving current pulse generators has hitherto impeded the use of electro-acoustic delay lines for storage in digital circuitry.

It is, therefore, an object of the instant invention to provide a current pulse generator capable of supplying accurately shaped current pulses to an inductive load, such as the launch coil of an electro-acoustic delay line.

It is a further object of the instant invention to provide an improved current pulse-generating circuit adapted for driving the launch coils of electro-acoustic delay lines without the employment of critical, or specially selected, components, such as transistors, or the like.

According to the instant invention, therefore, a current pulse-generating circuit is provided, comprising a first transistor and a second grounded base transistor, said first transistor being normally biased to conduction and said second transistor being normally biased to cut-off, the collector circuit of said second transistor being substantially electrically independent of the collector circuit of said first transistor and including terminals for attachment to an inductive load; and transformerless pulse-generating means for interrupting the conduction of said first transistor for a predetermined interval, thereby causing conduction in said second transistor and said inductive load during said predetermined interval.

Other objects of the instant invention will, in part, be obvious, and will, in part, appear hereinafter.

The instant invention, accordingly, comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description, taken in connection with the accompanying drawings, in which:

FIG. 1 is a schematic drawing of a circuit embodying the instant invention;

FIG. 2 represents a typical input signal applied to the input of the embodiment of the invention shown in FIG. 1, whereby to produce a driving pulse in the launch coil shown in FIG. 1;

FIG. 3 represents the pulse produced at the base of transistor Q-2 of FIG. 1 in response to the application of the input pulse of FIG. 2 to the base of transistor Q-1 of FIG. 1;

FIG. 4 represents the voltage wave appearing at the collector of transistor Q-3 of FIG. 1 in response to the application of the input pulse of FIG. 2 to the base of transistor Q-1 of FIG. 1; and FIG. 5 represents the current pulse produced in launch coil CL-1 by the embodiment of the instant invention shown in FIG. 1.

Referring now to FIG. 1, it may be seen that the circuit of a typical embodiment of the instant invention is generally comprised of two subcircuits: the control pulse generating subcircuit, which comprises transistor Q-1, diode D-1, and a resistive-capacitive pulse duration determining network, including resistors R-1 and R-2, potentiometer P-1, and capacitor C-1; and the current-switching subcircuit, comprising transistors Q-2 and Q-3, resistors R-3, R-4, and R-5, diodes D-2 and D-3, and safety lamp L-1.

For ease of understanding, the normal state of conduction of each of the transistors of FIG. 1 is shown by cross-hatching, or the absence thereof. That is, Q-2 is shown in FIG. 1 as cross-hatched, thus indicating that Q-2 is normally conductive. Transistors Q-1 and Q-3, on the other hand, are not shown as cross-hatched, thus indicating that these two transistors are normally non-conductive. By "normally" is meant the condition which obtains during the quiescent period when a current pulse is not being generated at output terminals TM–2 and TM–3. It may be seen from FIG. 1, then, that transistors Q–1 and Q–3 are cut off during the quiescent period when no output pulse is being generated, whereas transistor Q–2 is conductive during the quiescent period when no output current pulse is being generated.

As will be apparent to those skilled in the art from inspection of the control pulse-generating subcircuit portion of FIG. 1, diode D–1 functions to maintain the base of transistor Q–2 at a negative potential with respect to ground equal to the forward drop thereof. Diode D–1 maintains the base of transistor Q–2 at this potential at all times, save when a negative-going signal applied to the input of transistor Q–1 (the base thereof) serves to initiate conduction in resistor R–1, thereby changing the potential at the left-hand terminal of condenser C–1 and generating a control pulse (FIG. 3) which is applied to the base of transistor Q–2. The time duration of this control pulse is independent of the time duration of the input pulse supplied to input terminal TM–1 when said input pulse is longer than a minimum duration determined by the parameters of the control pulse-generating circuit, but is determined by the width of the input pulse when the input pulse is shorter than said minimum duration. Comparison of the time duration of the input pulse ($t_0$ to $t_1$) as shown in FIG. 3 with the time duration of the control pulse (T) as supplied to the base of Q–2, also shown in FIG. 3, shows that the time duration of the control pulse generated in the embodiment shown in FIG. 1 may be shorter than the time duration of the input pulse shown in FIG. 2. Thus, in a preferred embodiment of the instant invention, the time duration of the input pulse applied to terminal TM–1 may be greater than the duration of the control pulse, as determined by the parameters of the resistive-capacitive pulse duration determining network, by any desired amount.

It will be realized in this discussion, and in what follows, that the wave forms shown in FIGS. 2, 3, 4, and 5 are idealized, and represent the pulses which would be produced in, or applied to, an optimum embodiment of the instant invention for a particular application, rather than those which obtain in all cases and in all embodiments of the instant invention. Further, as will be clear from inspection, these figures are not necessarily drawn to the same time or amplitude scale.

Referring now to the current-switching subcircuit of FIG. 1, it should be noted that the values of the voltage supplies, the values of resistors R–3 and R–4, and the diode and transistor types, i.e., 2N1305 and 1N622, were so selected that, in the normal state of circuit operation, transistor Q–2 operates in the active region of conduction, and not in the saturation region. Thus, the time of occurrence of the leading edge of the output current pulse of the circuit of FIG. 1 is not substantially delayed by the storage of minority carriers in the base of transistor Q–2.

As may be seen in FIG. 1, the collector circuits of transistors Q–2 and Q–3 are electrically independent. That is, each branch of the respective collector circuits of said transistors proceeds from its correponding collector to some fixed voltage point without a connection to the other collector circuit, except at said points of fixed voltage, i.e., ground and —12 volts. This is true, of course, when the collector circuit of transistor Q–2 is defined as extending from the collector thereof to the collector supply buss, i.e., the horizontal conductor shown in FIG. 1 as connected to a —12 source of potential, and the term "collector circuit" is taken to be so defined herein. Thus, the collector circuit of transistor Q–2 includes resistor R–3, and also includes diodes D–2 and D–3 connected from the collector to ground. It may be seen from FIG. 1 that the collector circuit of transistor Q–2 has no electrical elements in common with the collector circuit of transistor Q–3, when so designated.

The collector circuit of transistor Q–3, by the same definition, extends from the collector terminal of transistor Q–3 to said collector supply buss. Thus, the collector circuit of transistor Q–3 includes resistor R–5, safety lamp L–1, and output terminals TM–2 and TM–3, across which an appropriate load may be connected. In the principal application of the device of the invention, the launch coil CL–1 of an acoustic delay line would be connected across terminals TM–2 and TM–3.

As will be apparent tho those skilled in the art, transistor Q–2, which is normally conducting, must not only be operated in such a manner as to avoid saturation, as described above, but must also be so operated as to limit the power dissipated therein. This is accomplished in the device of the invention by the employment of resistor R–3 and the series chain of diodes D–2 and D–3. Thus, the collector potential of transistor Q–2 is regulated by diodes D–2 and D–3 operating in conjunction with collector load resistor R–3. Since the plate of diode D–3 is connected to ground, while the cathode of diode D–2 is connected to the —12 volt collector supply buss through collector load resistor R–3, the current passing through these diodes and resistor R–3 will increase until the drop across R–3 is substantially equal to the —12 volt supply potential less the inherent forward voltage drop of these two diodes. By this means, the collector of transistor Q–2 will be maintained at substantially twice the forward voltage drop of a 1N622 diode above (negative with respect to) ground. Employing run-of-stock 1N622 diodes, which are not specially selected, the collector potential of Q–2 is maintained with sufficient accuracy to avoid burnout, while at the same time permitting the use of standard value, wide tolerance resistors R–3 and R–4. As will be apparent to those skilled in the art, resistor R–4 functions to limit the current through transistor Q–3 during the pulse-generating period when conduction is switched thereto from transistor Q–2, there being no other substantial impedance in the base-collector circuit of transistor Q–3 after the termination of the reactive voltage impulse occasioned by the build-up of the field to launch coil CL–1 upon initiation of the current pulse therethrough.

Resistor R–5 is provided, inter alia, to absorb the back-swing impulse generated in launch coil CL–1 at the termination of the current pulse supplied by the current pulse generator of the invention. This back-swing impulse is represented in the voltage wave form of FIG. 4 in idealized manner, occurring there as the downwardly-going lobe.

The embodiment of the invention shown in FIG. 1 operates to produce a substantially rectangular current pulse through launch coil CL–1 as follows:

In the quiescent, or non-pulse producing state of operation of this embodiment, transistor Q–2 is in an unsaturated conducting state (as shown by the cross-hatching in FIG. 1), while transistors Q–1 and Q–3 are in the cutoff condition.

To initate a current pulse in coil CL–1, a negative-going input pulse shown in FIG. 2 is applied to the base of transistor Q–1 through input terminal TM–1. By means of this negative-going pulse, transistor Q–1 is driven to conduction, thereby altering the voltage drop across resistor R–1, and, thus, the potential at the cathode of diode D–1, and at the base of transistor Q–2. An idealized representation of the control pulse which appears at the cathode of diode D–1 as a result of the application of the negative-going edge, or transition, of the pulse of FIG. 2 to the base of transistor Q–1 is shown in FIG. 3. As described above, the base of transistor Q–2 is normally held slightly negative, i.e., by an amount equal to the forward voltage drop of diode D–1, and, thus, it may be seen that the "height" of the pulse of FIG. 3 is far greater than is necessary to cut off conduction in transistor Q–2. It follows from this that conduction in transistor Q–2 is cut off when the leading edge of the pulse of FIG. 3 has risen but a small portion of its total upward excursion. The downwardly sloping trailing edge of the pulse of FIG. 3 is determined by the time constant of the resistive-capacitive pulse duration determining circuit R–2, P–1, C–1. The width, or time duration, of the control pulse of FIG. 3 is determined by the parameters of the control pulse generating subcircuit when ($t_0$ to $t_1$) is greater than a certain minimum pulse width value, below which the control pulse width is determined by ($t_0$ to $t_1$).

Referring now to the current-switching subcircuit of FIG. 1, it will be clear that upon termination of the current through transistor Q–2, a switching action will take place which will substantially instantaneously initiate conduction in transistor Q–3.

The amplitude of the current pulse passing through transistor Q–3, and launch coil CL–1, will be largely determined by the value of resistor R–4, since, the base of transistor Q–3 being grounded, the potential developed across resistor R–4 controls conduction through transistor Q–3, thus limiting the current in transistor Q–3. As will become apparent to those skilled in the art, the reactive voltage initially generated in coil CL–1 by the rise of current therein will also serve to limit the current passing therethrough; but, after this initial reactive voltage is terminated by full build-up of the field in CL–1, current through CL–1 will be limited largely by the bias produced across resistor R–4.

The termination of the output current pulse passing through transistor Q–3 and launch coil CL–1 is brought about by the return to conduction of transistor Q–2. This happens when the charge stored in C–1, during the previous quiescent period, has drained through the R–2, P–1, –12 volt supply, ground return path, and, thus, the base of Q–2 has returned to its slightly negative "on" condition. At this time, the reinitiation of conduction in transistor Q–2 results in sufficient voltage drop across resistor R–4 to sharply terminate the conduction of transistor Q–3. When the current in transistor Q–3 terminates, the collapse of the field in launch coil CL–1 will result in a "back-swing" voltage across coil CL–1. The energy of this "back-swing" voltage is largely absorbed in resistor R–5, thus limiting the peak voltage across Q–3. In this connection, it is to be noted that the wave form of FIG. 4 is a voltage wave form, and not a current wave form. Thus, the downwardly-going lobe of the wave form of FIG. 4 is not found to any substantial degree in the current pulse wave form of FIG. 5.

It will be appreciated that, by the above-described construction, a current pulse generator is provided which is characterized by the rectangularity of its output current wave form, and which, at the same time, may be constructed of relatively inexpensive "stock" parts, and need not be constructed of expensive, specially produced or selected resistors, transistors, and the like, the necessity for which special components characterized the known prior art devices. In addition, it will be appreciated that, by the above-described construction, a current pulse generator is provided which enables the production of high accuracy current pulses by the employment of a minimum of components, thereby avoiding the complexity which characterized known prior art devices.

It will thus be seen that the objects set forth above, among those made apparent from the preceding description, are efficiently attained and, since certain changes may be made in the above constructions without departing from the scope of the invention, it is intended that all matter contained in the above description, or shown in the accompanying drawings, shall be interpreted as illustrative and not in a limiting sense. Thus, the selection of particular transistor, or diode, types, or the selection of particular resistor values, except within the broad teachings found above, is not to be held to be a limitation of the invention described herein.

It is particularly noted that, although the invention has been described above in terms of a fixed value of time constant determining the width of the control pulse of FIG. 3, a variable potentiometer may be provided, as shown in FIG. 1, thereby making it possible to vary the duration of the control pulse, and thus vary the duration of the current pulse.

In addition, although the invention has been disclosed as being especially desirable for driving the input transducers of electro-acoustic delay lines, the current pulse generator of the invention may also be employed in driving alternative memory, or storage, devices.

It is also to be understood that the following claims are intended to cover all of the generic and specific features of the invention herein described, and all statements of the scope of the invention which, as a matter of language, might be said to fall therebetween.

What is claimed is:

1. A pulse generator comprising: first, second, and third transistors, each having base, emitter, and collector electrodes, means biasing the first transistor normally to cutoff; the first transistor having its emitter electrode grounded and its collector electrode connected to one terminal of a capacitor the other terminal of which is connected to the cathode of a diode having a grounded plate, and to a variable resistance branch which, with said capacitor, is arranged to generate a pulse of predeterminable duration in response to the application to the base electrode of said first transistor of an input pulse of greater duration than said predeterminable duration; said biasing means also biasing the second transistor to operate normally in the unsaturated active region, the second transistor having its emitter electrode connected to a terminal of a resistor, said second transistor having its base electrode connected to the cathode of said diode so as to be cut off during said pulses of predeterminable duration; means connecting the collector of the second transistor to a source of reference potential for maintaining said second transistor in an unsaturated condition during conduction, said biasing means further biasing the third transistor to cutoff normally; the third transistor having its emitter electrode connected to said terminal of said resistor and its base electrode to said reference potential source, and being so biased as to become conductive during said pulses of predeterminable duration, said variable resistance branch and another terminal of said resistor being further connected to said biasing means thereby supplying current pulses of said predeterminable duration to an inductive load connected to its collector electrode.

2. A current pulse generator comprising: a first transistor and a second transistor, each having base, emitter, and collector electrodes, means biasing said first transistor to an unsaturated conductive condition and said second transistor to a cutoff condition, the second transistor having its base electrode connected to ground, means connecting the collector electrode of the first transistor to a reference potential source and maintaining said first transistor unsaturated during conduction, the emitter electrodes of said transistors being connected to a common impedance; and capacitive-resistive pulse-generating means coupled to the base electrode of said first transistor for interrupting the conduction of said first transistor for a preselectable interval, and, thereby, causing conduction in the second transistor and in an inductive load connected to its collector electrode during said preselectable interval.

3. A pulse generator comprising: first, second, and third transistors, each having base, emitter, and collector electrodes, the first transistor having its emitter electrode connected to ground and having a pulse-generating network connected to its collector electrode and to the base electrode of the second transistor for generating control pulses of predetermined duration in response to the application to the base electrode of said first transistor of input pulses of greater duration than said predetermined duration; means biasing the second transistor to operate normally in the unsaturated active region, the second transistor sharing a common emitter impedance with the third transistor, means connecting the collector electrode of said second transistor to a reference potential source to maintain said second transistor unsaturated during conduction, said second transistor being cut off during application to its base electrode of a control pulse received from said network; said biasing means also biasing said third transistor to cutoff normally, the third transistor having its base electrode connected to said ground, whereby to supply current pulses of said predetermined duration to an inductive load connected to its collector electrode.

4. In the circuit of the type described:
 (a) a control pulse-generating network having an input and an output, said network including a resistive-capacitive subcircuit which produces a control pulse having a predetermined duration at said output in response to a pulse received at said input;
 (b) first and second transistors, each having base, collector, and emitter electrodes, the emitter of said first transistor being connected to a voltage supply source through a load impedance, the emitter of said second transistor being connected to the emitter of said first transistor, the base of the second transistor being connected to a source of reference potential, and the collector of the first transistor being connected through unidirectional conducting means to said reference potential source for maintaining said first transistor unsaturated during conduction, and
 (c) means biasing said first transistor to non-saturated conduction and said second transistor to cutoff;
 (d) the base of said first transistor being connected to the output of said control pulse-generating network whereby a control pulse received therefrom terminates the conduction of the first transistor and causes conduction of the second transistor for a time interval equal to the duration of the control pulse thereby supplying a current pulse to an inductive load connected to the collector of the second transistor.

5. A pulse generator comprising:
 (a) a control pulse-generating subcircuit having an input and an output, said subcircuit including a resistance-capacitive network which produces at the output a control pulse having a predetermined duration in response to a trigger pulse received at said input; and
 (b) a current switching subcircuit, which has an input connected to the output of the control pulse-generating subcircuit and an output adapted to be connected to an inductive load, said subcircuit including first and second transistors which have base, emitter, and collector electrodes, means normally biasing the first transistor to nonsaturated conduction and the second transistor to cutoff, the base electrode of said first transistor connected to said current switching subcircuit input and the base electrode of the second transistor being connected to a reference potential source, and the collector electrode of the first transistor being connected through diode means to said reference potential source for maintaining said first transistor unsaturated during conduction, the emitter electrodes of the first and second transistors being connected through a common resistor to a voltage supply source, whereby the application of a control pulse generated by the first mentioned subcircuit to the input of the second mentioned subcircuit terminates conduction of the first transistor and causes conduction by the second transistor so that a rectangular current pulse having a duration equal to the duration of the control pulse may be passed through an inductive load connected to the collector electrode of the second transistor.

References Cited by the Examiner
UNITED STATES PATENTS

| | | | |
|---|---|---|---|
| 2,952,784 | 9/1960 | Carr | 307—88.5 |
| 2,953,695 | 9/1960 | Rywak | 307—88.5 |
| 2,981,296 | 4/1961 | Paul et al. | 317—148.5 X |
| 2,986,650 | 4/1961 | Wolfendale | 307—88.5 |
| 2,997,601 | 8/1961 | Taylor et al. | 307—88.5 |
| 3,018,420 | 1/1962 | Norris | 307—88.5 |
| 3,049,624 | 8/1962 | Riley | 307—88.5 |
| 3,073,422 | 1/1963 | Baumann | 307—88.5 X |
| 3,086,109 | 4/1963 | Kaehms | 317—148.5 X |

J. HEYMAN, J. ZAZWORSKY, *Assistant Examiners.*

ARTHUR GAUSS, *Primary Examiner.*